US 12,381,803 B2

(12) United States Patent
Veyland

(10) Patent No.: US 12,381,803 B2
(45) Date of Patent: Aug. 5, 2025

(54) AUTOMATIC CONNECTION OF NETWORK PROBES

(71) Applicant: Airbus Defence and Space SAS, Toulouse (FR)

(72) Inventor: René Veyland, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 409 days.

(21) Appl. No.: 18/084,108

(22) Filed: Dec. 19, 2022

(65) Prior Publication Data

US 2023/0308375 A1 Sep. 28, 2023

(30) Foreign Application Priority Data

Dec. 22, 2021 (FR) ...................................... 2114243

(51) Int. Cl.
*H04L 43/0882* (2022.01)
*H04L 43/12* (2022.01)

(52) U.S. Cl.
CPC .......... *H04L 43/0882* (2013.01); *H04L 43/12* (2013.01)

(58) Field of Classification Search
None
See application file for complete search history.

(56) References Cited

U.S. PATENT DOCUMENTS

| 6,668,282 | B1 | 12/2003 | Booth, III et al. |
| 7,599,283 | B1* | 10/2009 | Varier ................ H04L 41/0896 370/254 |
| 2007/0177518 | A1* | 8/2007 | Li .......................... H04L 43/50 370/254 |
| 2021/0218658 | A1 | 7/2021 | Vasseur et al. |
| 2023/0208757 | A1* | 6/2023 | Wang .................... H04L 45/566 |

FOREIGN PATENT DOCUMENTS

CN 102571524 A 7/2012

OTHER PUBLICATIONS

French Search Report dated Jul. 7, 2022; priority document.

* cited by examiner

*Primary Examiner* — Angela Nguyen
(74) *Attorney, Agent, or Firm* — Greer, Burns & Crain, Ltd.

(57) ABSTRACT

A first network probe is associated with a first end-point of a first router. The first network probe detects, by filtering packets coming from or going to the first router, a communication tunnel between the first end-point and a second end-point of a second router. The first network probe deduces an address of a second network probe associated with the second end-point, by applying a bijective translation function relative to an address of the second end-point retrieved from the filtered packets. Inter-probe communications are set-up between the first and second network probes, using the deduced address of the second network probe, and data traffic in the communication tunnel is jointly monitored by the first and second network probes.

10 Claims, 5 Drawing Sheets

AUTOMATIC CONNECTION OF NETWORK PROBES

CROSS-REFERENCES TO RELATED APPLICATIONS

This application claims the benefit of the French patent application No. 2114243 filed on Dec. 22, 2021, the entire disclosures of which are incorporated herein by way of reference.

FIELD OF THE INVENTION

The present invention relates to the field of network probes for monitoring traffic passing through a communication tunnel, and thus managing congestion states in communication networks, for example, of the Wide Area Network (WAN) type, and, more particularly, to the automatic connection of such network probes.

BACKGROUND OF THE INVENTION

Communication networks are used to provide a wide variety of services, such as exchanging voice communications, typically Voice over IP (VOIP) services, exchanging audio-visual communications, broadcasting multimedia programs, or even data access, typically access to web services. These services have different requirements in terms of transmission latency in the communication networks, and have different priorities.

The communication links that communication networks rely on are based on physical transmission technologies that can be very diverse. Each of these technologies results in different properties for the transmission channel that is used in terms of capacity, i.e., available bandwidth, error rate, or variability of this available bandwidth.

In order to suitably manage the admission of services while taking into account these different transmission channel properties, network probes are used to analyze the traffic passing through these communication networks, and in particular through communication tunnels established between routers of these communication networks.

One problem lies in the configuration of these network probes in order to allow them to be set up automatically, despite the dynamic nature of establishing these communication tunnels. It is therefore desirable for at least this disadvantage of the prior art to be addressed in a simple, effective and inexpensive manner.

SUMMARY OF THE INVENTION

A method is proposed that is implemented by a network probe in a communication system comprising a plurality of routers, the network probe being associated with a first router of the plurality of routers and with a first end-point of the first router, the method being carried out by the network probe, called first network probe herein. The method comprises the following steps: detecting, by filtering packets coming from or going to the first router, a communication tunnel between the first end-point and a second end-point of a second router of the plurality of routers; retrieving, from at least one filtered packet, an address of the second end-point; deducing an address of a second network probe associated with the second end-point and the second router, by applying a bijective translation function relative to the retrieved address of the second end-point; setting-up inter-probe communications between the first network probe and the second network probe, using the deduced address of the second network probe; and carrying out data traffic monitoring in the communication tunnel, jointly by the first network probe and the second network probe, by measuring data traffic transmitted and received at the first end-point and the second end-point, respectively.

Thus, by virtue of predefining the address of the second network probe relative to the address of the second end-point that has been retrieved from the filtered packets (and similarly, by virtue of predefining the address of the first network probe relative to the address of the first end-point), inter-probe communications can be set up automatically.

In a particular embodiment, the bijective translation function involves applying a predefined offset relative to the retrieved address of the second end-point.

In a particular embodiment, the address of the second network probe is deduced from the retrieved address of the second end-point, by adding one to the retrieved address of the second end-point.

In a particular embodiment, monitoring data traffic in the communication tunnel, jointly by the first network probe and the second network probe, is carried out per service type.

In a particular embodiment, the filtering of packets coming from or going to the first router retrieves GRE ("Generic Routing Encapsulation") or IPSec ("Internet Protocol Security") type data packets.

In a particular embodiment, the first network probe receives information from the second network probe representing received data for the traffic, compares it with information representing data transmitted by the first network probe for the traffic, determines whether a difference between received and transmitted data is greater than a predefined threshold, and, if so, determines the existence of a congestion situation.

In a particular embodiment, information representing traffic monitoring is transmitted to an orchestrator of the communication system in order to adapt admissions of services.

A computer program product is also proposed comprising instructions for implementing the above method according to any one of these embodiments, when the instructions are executed by a processor. An information storage medium is also proposed for storing such a computer program product comprising instructions for implementing the method when the instructions are read from the information storage medium and are executed by a processor.

A device is also proposed that is configured to implement a network probe, called first network probe herein, of a communication system comprising a plurality of routers, the network probe being associated with a first router of the plurality of routers and with a first end-point of the first router, the device comprising electronic circuitry configured to: detect, by filtering packets coming from or going to the first router, a communication tunnel between the first end-point and a second end-point of a second router of the plurality of routers; retrieve, from at least one filtered packet, an address of the second end-point; deduce an address of a second network probe associated with the second end-point and the second router, by applying a bijective translation function relative to the retrieved address of the second end-point; set-up inter-probe communications between the first network probe and the second network probe, using the deduced address of the second network probe; and carry out data traffic monitoring in the communication tunnel, jointly by the first network probe and the second network probe, by measuring data traffic transmitted and received at the first end-point and the second end-point, respectively.

A communication system is also proposed comprising a plurality of routers and comprising at least one communication tunnel between end-points of the routers, wherein a plurality of devices arranged as set forth above is configured to implement network probes, in order for the network probes to jointly monitor data traffic in the one or more communication tunnel(s).

BRIEF DESCRIPTION OF THE DRAWINGS

The aforementioned features of the invention, and other features, will become more clearly apparent upon reading the following description of at least one embodiment, with the description being provided with reference to the accompanying drawings, in which.

DETAILED DESCRIPTION OF THE PREFERRED EMBODIMENTS

Figure 1A:
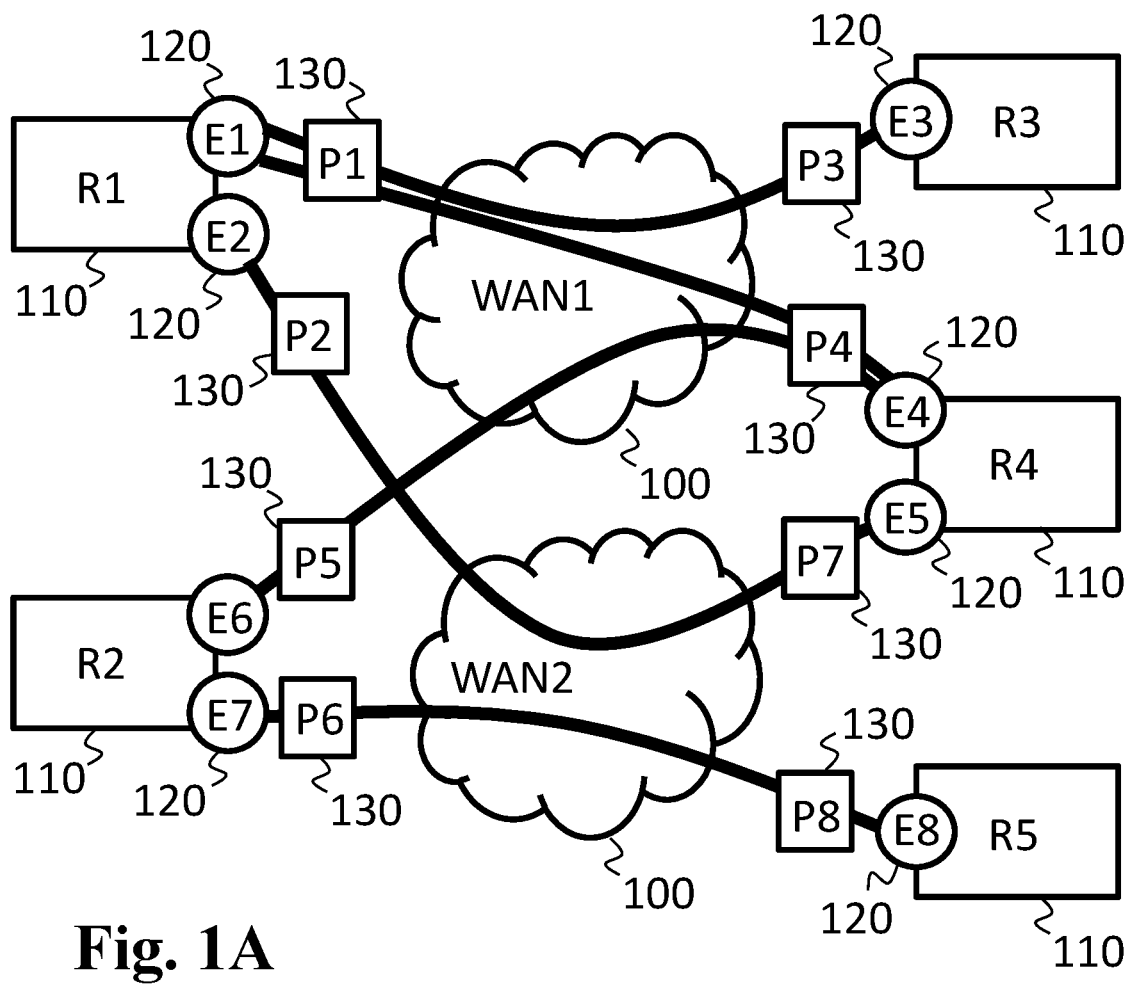
FIG. 1A schematically illustrates a communication system in which the invention can be implemented.

FIG. 1A schematically illustrates a communication system in which the invention can be implemented.

The communication system comprises a plurality of routers 110. Five routers R1 to R5 are shown in FIG. 1A by way of an illustration. The routers 110 are interconnected by at least one communication network 100, on which the routers 110 establish communication tunnels. Thus, the routers 110 comprise at least one end-point 120 of a communication tunnel. Each end-point 120 can relate to one or more communication tunnel(s).

Each communication network 100 can be of a varied type, whether it is wired such as Ethernet links, for example, or optical fiber, or radio such as, for example, a Wireless Local Area Network ("WLAN") such as a network from the IEEE 802.11 group of standards, or such as, for example, satellite links. Two communication networks 100 WAN1 and WAN2, of the Wide Area Network (WAN) type, are shown in FIG. 1A by way of an illustration.

The communication tunnels are implemented, for example, by virtue of the GRE ("Generic Routing Encapsulation") protocol or from the IPsec ("Internet Protocol Security") group of standards. Alternatively, other tunnelling protocols can be used.

Preferably, the communication tunnels are secured by encryption, so that the data encapsulated in the encapsulation protocol of the communication tunnel cannot be deciphered by a device located between the two end-points 120 of the communication tunnel.

As illustrated in FIG. 1A, a first communication tunnel is established on the network WAN1 between an end-point E1 of the router R1 and an end-point E3 of the router R3, and a second communication tunnel is established on the network WAN1 between the end-point E1 and an end-point E4 of the router R4. A third communication tunnel is established on the network WAN2 between an end-point E2 of the router R1 and an end-point E5 of the router R4. A fourth communication tunnel is established on the network WAN1 between an end-point E6 of the router R2 and the end-point E4 of the router R4. A fifth communication tunnel is established on the network WAN2 between an end-point E7 of the router R2 and an end-point E8 of the router R5.

The communication system is equipped with network probes 130. The network probes 130 are arranged and configured to carry out data rate measurements for data entering the communication tunnels and for data exiting the communication tunnels, i.e., at the end-points 120 of the communication tunnels, so as to be able to detect congestion situations in the one or more communication network(s) 100. The data rate measurements are measurements, over a predefined period of time, of data volumes encapsulated in the protocol of the communication tunnels. The network probes 130 can be included in or be connected to the routers 110, as long as the network probes 130 have access to the data plan of the routers 110 in order to capture packets transmitted in the communication tunnels and to be able to set-up an inter-probe communication protocol, which allows the network probes 130 of the end-points 120 of the same communication tunnel to send each other information relating to the measurements in order to carry out data rate computations. This ensures that the inter-probe communications protocol follows the same path as the packets of the communication tunnel monitored by the considered network probes 130.

One of the network probes 130 is thus associated with each end-point 120 of the communication tunnels to be monitored in terms of encapsulated data rate. In a particular embodiment, the same network probe 130 can be associated with several end-points 120 of the same router 110, and thus assist in monitoring several communication tunnels for the same router without these communication tunnels having any end-points in common. It also should be noted that communication tunnels can exist in the communication system while no network probes 130 are implemented at their end-points 120.

Each network probe 130 can implement a congestion management function that would be revealed by the completed data rate measurements, i.e., the data rate measurements carried out by the network probe 130 in conjunction with another one of the network probes 130 that is associated with the other end-point of one of the considered communication tunnels. The network probe 130 is then arranged and configured to modify data transmission profiles in the one or more communication network(s) 100 so as to take into account, preferably improve, the congestion situations that would be revealed by the completed data rate measurements. In a particular embodiment, each network probe 130 instructs a function for the admission of services of the router with which the network probe 130 is associated, in order to adapt the transmissions via each communication tunnel with an end-point 120 associated with the network probe 130.

Figure 1B:
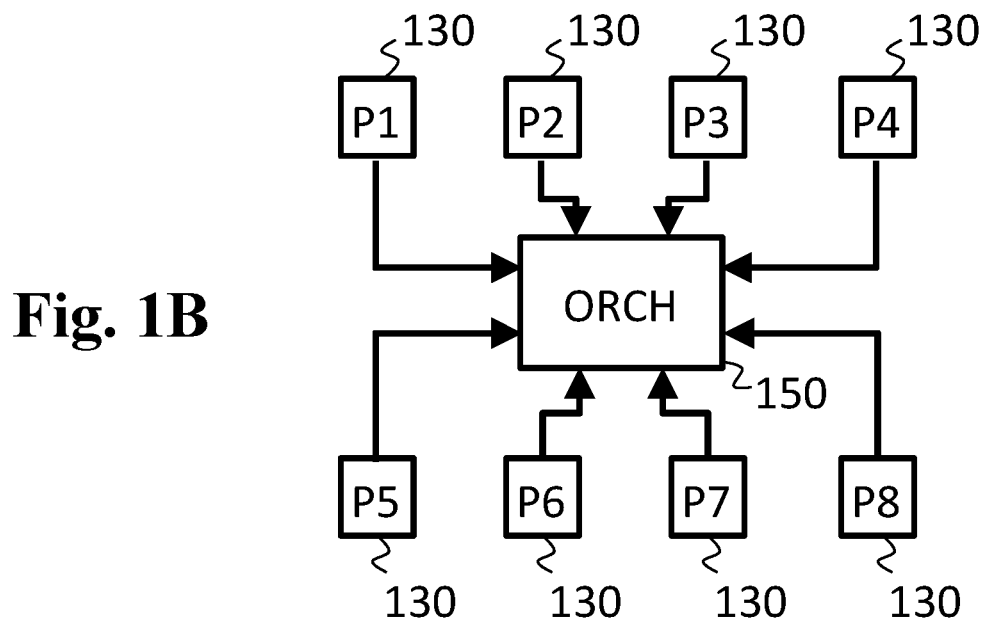
FIG. 1B schematically illustrates a communication architecture, applicable to the communication system of FIG. 1A, in which network probes are configured to feedback data traffic information to an orchestrator.

As an alternative embodiment, as illustrated in FIG. 1B, the network probes 130 are connected to an orchestrator 150. The network probes 130 are then arranged and configured to feedback information to the orchestrator 150 relating to the completed data rate measurements. The orchestrator 150 is then arranged and configured to modify data transmission profiles in the one or more communication network(s) 100 so as to take into account, preferably to improve, the congestion situations that would be revealed by the data rate measurements carried out by the network probes 130. Thus, the invention is particularly suitable for SD-WAN ("Software-Defined Wide Area Network") type infrastructures. In a particular embodiment, the orchestrator 150 defines and enforces a policy for the admission of services in the one or more communication network(s) 100 that takes into account the actual communication capacities in the one or more communication network(s) 100 and therefore takes into account the congestion situations revealed by the network probes 130.

Each network probe 130 has an address, for communicating in the one or more communication network(s) 100, that is predefined relative to the address of the end-point 120 of the communication tunnel with which the network probe 130 is associated. This allows the relevant network probes 130 to be automatically connected when a new communication tunnel is detected (for example, established).

Figure 2:
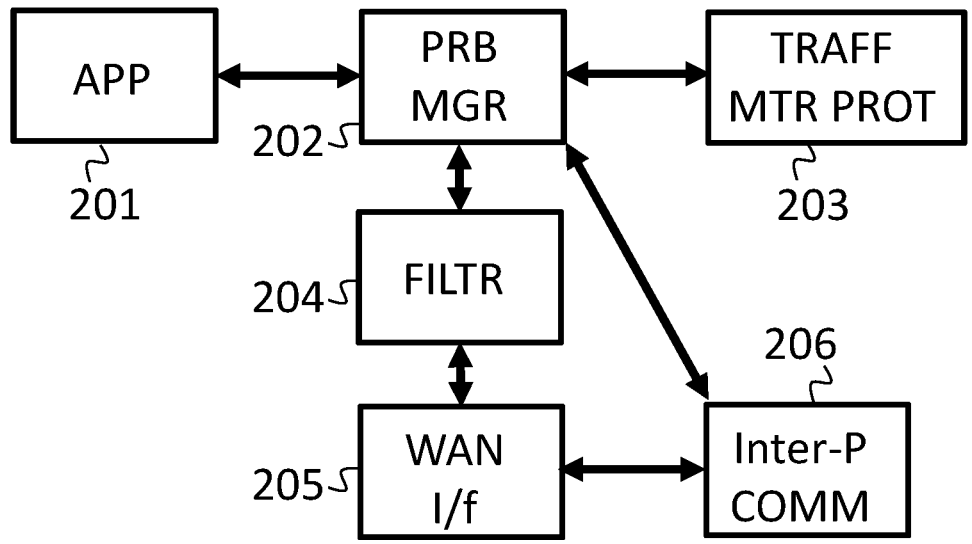
FIG. 2 schematically illustrates a modular architecture of network probes of the communication system.

FIG. 2 schematically illustrates a modular architecture implemented by the network probes 130.

Each network probe 130 then includes an interface module 205, for example, a WAN interface module, for transmitting and receiving data packets over the one or more communication network(s) 100.

Each network probe 130 also includes a filtering module 204 for retrieving, via the interface module 205, data packets relating to communication tunnels. Typically, the filtering module 204 allows a copy to be obtained of any GRE or IPSec type data packet.

Each network probe 130 also includes an inter-probe communication module 206, thereby allowing the network probe 130 to communicate with another one of the network probes 130 within the context of monitoring one of the communication tunnels. A dedicated User Datagram Protocol (UDP) port is preferably used to this end. In addition, each network probe 130 also includes an inter-probe protocol management module 203 for exchanging data rate measurement information for monitoring the communication tunnel.

Each network probe 130 also includes an application module 201 responsible for gathering information relating to the data rate of each communication tunnel monitored by the network probe 130. The application module 201 thus can be responsible for instructing the local router to modify data transmission profiles in the one or more communication network(s) 100 so as to take into account, preferably to improve (for example, management of admission of services), the congestion situations that would be revealed by the completed data rate measurements. As an alternative embodiment, the application module 201 is responsible for feeding back information to the orchestrator 150 relating to the completed data rate measurements in order to allow the orchestrator 150 to configure a particular router 110 in order to modify data transmission profiles in the one or more communication network(s) 100 so as to take into account, preferably to improve (for example, management of admission of services), the congestion situations that would be revealed by the completed data rate measurements.

Each network probe 130 also includes a probe management module 202 configured and arranged to store metrics related to the data rate measurements carried out by the network probe 130, to coordinate the establishment and the progress of inter-probe communications for a given communication tunnel, and to consolidate the stored metrics in order to provide the application module 201 with communication tunnel monitoring information.

Other modular architectures can be implemented for implementing the steps and behavior described herein without departing from the principles of the invention, in particular by otherwise distributing the functions carried out by the modules set forth above.

Figure 3:
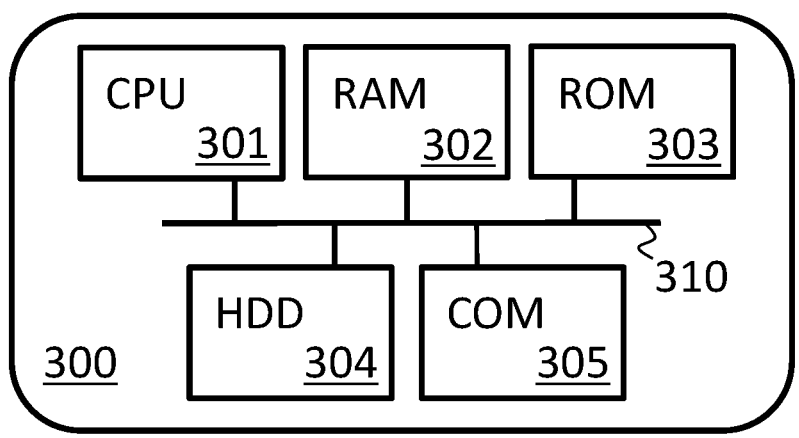
FIG. 3 schematically illustrates an example of a hardware architecture for implementing the network probes of the communication system.

FIG. 3 schematically illustrates an example of the hardware architecture of the network probes 130, and particularly allowing the modular architecture of FIG. 2 to be implemented. For illustrative purposes FIG. 3 will be considered to be representing the network probe P1.

The network probe P1 then comprises, connected by a communication bus 310: a processor or CPU ("Central Processing Unit") 301, or a cluster of such processors, such as GPUs ("Graphics Processing Units"), for example; a RAM ("Random Access Memory") 302; a ROM ("Read Only Memory") 303, or a rewritable memory of the EEPROM ("Electrically Erasable Programmable ROM") type, for example, of the Flash type; a data storage device, such as a Hard Disk Drive (HDD) 304, or a storage medium reader, such as a Secure Digital (SD) card reader; a set of input and/or output interfaces, such as communication interfaces 305, particularly allowing the network probe P1 to capture packets destined for the router 110 with which the network probe P1 is associated, or in transit via the router 110 with which the network probe P1 is associated, as well as to communicate with other network probes 130 of the communication system.

The processor 301 is capable of executing instructions loaded into the RAM 302 from the ROM 303, from an external memory (not shown), from a storage medium, such as an SD card or the HDD, or from a communication network. When the network probe P1 is powered on, the processor 301 is capable of reading instructions from the RAM 302 and of executing them. These instructions form a computer program causing the processor 301 to implement the steps, behaviors and algorithms described herein.

All or some of the steps, behaviors and algorithms described herein thus can be implemented in software form by a programmable machine, such as a DSP (Digital Signal Processor) or a processor, executing a set of instructions or can be implemented in hardware form by a machine or a dedicated chip or a dedicated chipset, such as a Field-Programmable Gate Array (FPGA) or an Application-Specific Integrated Circuit (ASIC).

It follows that the modular architecture of FIG. 2 can be implemented in software form by a programmable machine executing a set of instructions, or can be implemented in hardware form by a machine or a dedicated chip or a dedicated chipset.

In general, each network probe 130 comprises electronic circuitry arranged and configured to implement the steps, behaviors and algorithms described herein, and in particular the modular architecture of FIG. 2.

Figure 4:
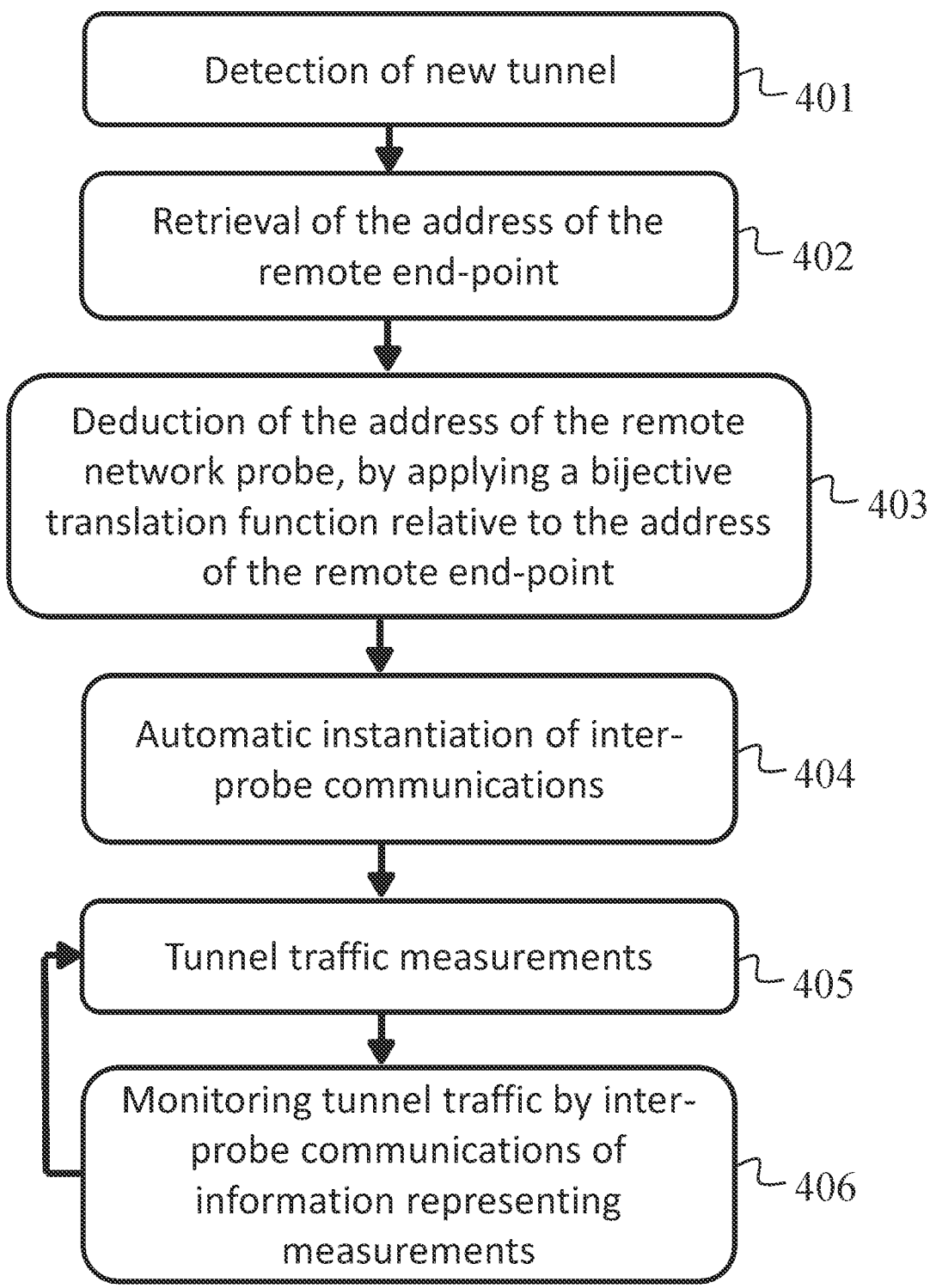
FIG. 4 schematically illustrates a flow chart for automatically connecting the network probes, and for setting-up traffic monitoring in at least one tunnel of the communication system.

FIG. 4 schematically illustrates a flow chart for automatically connecting the network probes 130, and for setting-up traffic monitoring in at least one tunnel of the communication system. The flow chart in FIG. 4 is implemented by each network probe 130.

In a step 401, the network probe 130 detects a new communication tunnel, an end-point of which is the end-point 120 with which the network probe 130 is associated. The detection of a new communication tunnel is preferably carried out by detecting the reception or transmission of a tunnel encapsulation packet, for example, of the GRE or IPSec type, corresponding to a communication tunnel that had not been previously detected. A new communication tunnel is thus detected when the source address and the destination address form a pair of end-points 120 still unknown to the network probe 130 (knowing that the network probe 130 is associated with one of the end-points 120).

In a step 402, the network probe 130 retrieves the address of the remote end-point, i.e., the one on the other side of the communication tunnel that was recently detected in step 401. If the destination address corresponds to the end-point 120 with which the network probe 130 is associated, then the address of the remote end-point is the source address. Conversely, if the source address corresponds to the end-point 120 with which the network probe 130 is associated, then the address of the remote end-point is the destination address. It should be noted that no Deep Packet Inspection (DPI) is required.

In a step 403, the network probe 130 deduces the address of the remote network probe, with which the network probe 130 must collaborate in order to monitor the considered communication tunnel, by applying a bijective translation function relative to the address of the remote end-point as retrieved in step 402.

In a particular embodiment, the address of the remote network probe is obtained by applying a predefined mapping rule.

In a particular embodiment, the remote network probe address is obtained by applying a predefined offset (positive or negative) relative to the remote end-point address.

In a particular embodiment, the remote network probe address is obtained by adding one (i.e., a unit) to the remote end-point address.

In a step 404, the network probe 130 automatically instantiates inter-probe communications between the network probe 130, which therefore monitors a first end-point 120 of the considered communication tunnel, and the remote network probe, which monitors the second end-point 120 of this communication tunnel. Automatic instantiation of inter-probe communications is achievable by virtue of predefining the addresses of the network probes 130 relative to the addresses of their respective end-points. Preferably, each network probe 130 opens a network socket with the address of its associated end-point 120, to which the bijective translation function is applied, and with a dedicated UDP port. This allows each network probe 130 to receive UDP messages that are addressed, by any other network probe 130, to this address and this dedicated UDP port.

Thus, when a communication tunnel is set up between two end-points 120, each of the network probes 130 monitoring one of the ends of the communication tunnel detects the passage of a packet in the communication tunnel. By virtue of predefining the addresses of the network probes 130 relative to those of the end-points 120 with which the network probes 130 are associated, the connection of the network probes 130 can be established automatically so as to jointly monitor the traffic (without deep packet inspection).

In a step 405, the network probe 130 carries out data rate measurements for the considered communication tunnel. The data rate measurements are carried out by counting the amount of data transmitted and/or received over periodic cycles. The data rate measurements can be carried out by traffic type (or types of service) in the communication tunnel, for example, based on traffic type (or service type) information included in the encapsulation packets of the communication tunnel. In a particular embodiment, the data rate measurements are carried out by Differentiated Services Code Point (DSCP) field values of the encapsulation packets of the communication tunnel.

In a step 406, the network probe 130 monitors the data traffic in the considered communication tunnel, based on the measurements carried out in step 405. The principle of monitoring the communication tunnel consists of comparing the measurements of the data rate entering the communication tunnel (at one end-point) with those of the data rate exiting the communication tunnel (at the other end-point). Information representing the data rate measurements carried out by one network probe is transmitted to the other network probe on the other side of the communication tunnel (potentially in both directions), and a difference between these data rates beyond a predetermined margin indicates congestion. The information then can be used, for example, by an admission of services mechanism so as to adapt an admission of services policy accordingly in order to be more consistent relative to the actual transmission capacities of the one or more communication network(s) 100 (for example, taking into account the bandwidth variability of a satellite link). Without any adjustment of the admission of services policy, packet losses will affect the various services, which potentially may cease to function or be severely degraded. On the contrary, an adjustment of the admission of services policy will designate a (lower priority) service to be interrupted or degraded, allowing the other (higher priority) services to continue to function correctly.

A loop is then created between steps 406 and 405, so as to monitor the traffic in the considered communication tunnel, in periodic cycles. An automaton for transmitting information representing the data rate measurements is described hereafter with reference to FIG. 6, in a particular embodiment.

Figure 5:
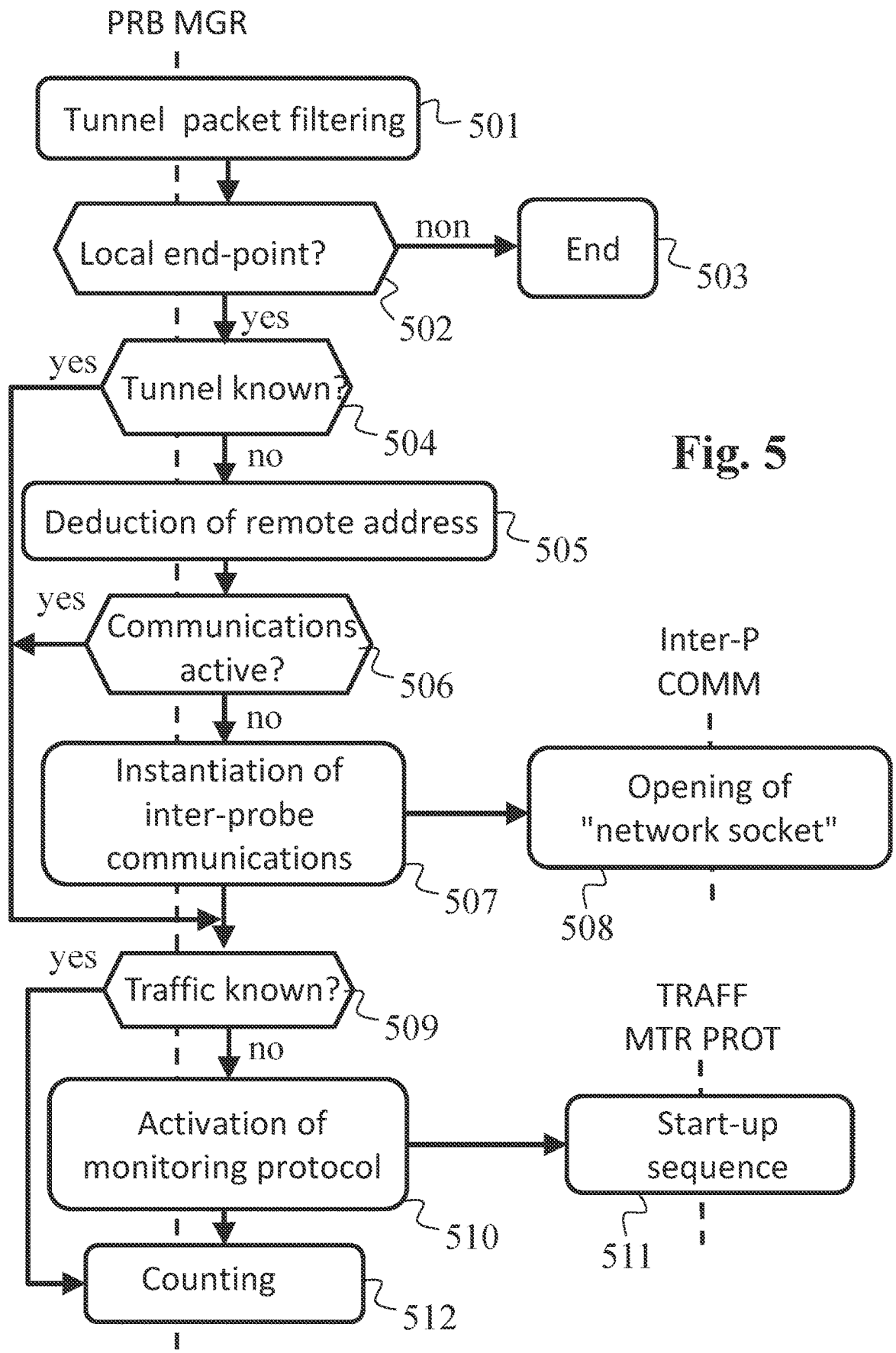
FIG. 5 schematically illustrates a flow chart for automatically connecting the network probes in a particular embodiment.

FIG. 5 schematically illustrates a flow chart for automatically connecting network probes 130, in a particular embodiment.

The flow chart of FIG. 4 is implemented by each network probe 130. FIG. 5 is described herein with reference to the modular architecture shown in FIG. 2.

In a step 501, the probe management module 202 obtains a data packet from the communication tunnel, resulting from the filtering carried out by the filtering module 204 on all the data packets passing (transmitting/receiving) through the interface module 205.

In a step 502, the probe management module 202 determines whether the filtered data packet originates from an end-point local to the router with which the considered network probe 130 is associated, or is destined for such an end-point local to the router. If so, a step 504 is carried out; otherwise, in a step 503, the algorithm is terminated.

In step 504, the probe management module 202 determines whether the filtered data packet originates from a communication tunnel already known to the considered network probe 130. In other words, the probe management module 202 determines whether the source address and the destination address of the filtered packet form a pair of end-points 120 identified in the memory of the considered network probe 130. If so, a step 509 is carried out; if not, the probe management module 202 instantiates a descriptor for the communication tunnel in the memory (in a database, for example), which descriptor is identified by the source address and the destination address of the filtered packet, for the subsequent storage of metrics relating to data traffic measurements of the communication tunnel. A step 505 is also carried out.

In step 505, the probe management module 202 deduces the address of the network probe 130, which is associated with the end-point on the other side of the communication tunnel. To this end, the probe management module 202 retrieves, from the filtered packet (or from a series of packets thus filtered), an address of this end-point on the other side of the communication tunnel. The probe management module 202 deduces an address of this other network probe 130 therefrom, by applying a bijective translation function (for example, a predefined offset) relative to the end-point address that has been retrieved. This deduced address then can be used to transmit messages to the other network probe 130 within the context of the inter-probe communication protocol. For example, via UDP messages addressed to this address, with a dedicated UDP port. The other network probe 130 simply needs to open a corresponding network socket in order for the considered messages to be received.

In a step 506, the probe management module 202 determines whether communications are already active with the local network probe 130, which means that another tunnel has already been established with the local end-point 120. If so, step 509 is carried out; if not, this means that the first communication tunnel is locally managed for the considered end-point 120, and the probe management module 202 instantiates, in a step 507, the inter-probe communication module 206, allowing it to communicate with other network probes 130 of the communication system. In addition, in a step 508, the inter-probe communication module 206 opens, following an instruction from the probe management module 202, a network socket with its own address. Its own address is defined in the same way as for the other network probe 130, i.e., by applying the bijective translation function to the address of the associated end-point. This allows messages to be received that will be transmitted by the other network probe 130 within the context of the inter-probe communication protocol. As already mentioned, a dedicated UDP port can be used. Then step 509 is carried out.

In step 509, the probe management module 202 determines whether the filtered packet corresponds to a type of traffic (or service) that is already monitored, and therefore known to the considered network probe 130, in the communication tunnel. For example, the relevant traffic (or service) is identified by the value of a DSCP field of the filtered packet. If so, a step 512 is carried out; otherwise, a step 510 is carried out.

In step 510, the probe management module 202 activates the monitoring protocol for the considered traffic. An automaton for transmitting information between the relevant network probes representing data rate measurements carried out for the considered traffic type in the considered communication tunnel is then instantiated by the inter-probe protocol management module 203, following an instruction from the probe management module 202. The inter-probe protocol management module 203 thus initiates a start-up sequence of the automaton. Step 512 is then carried out.

In step 512, the probe management module 202 counts the data encapsulated in the filtered packet. The probe management module 202 updates (increments), in the descriptor in the memory corresponding to the relevant service for the relevant communication tunnel, the amount of useful data contained in the filtered packet that has been received or transmitted (depending on the considered communication direction) via the end-point 120 with which the relevant network probe 130 is associated. The probe management module 202 thus updates the metrics related to the data rate measurements carried out by the network probe 130. The algorithm is then terminated until a new filtered packet is received by the filtering module 204.

Figure 6:
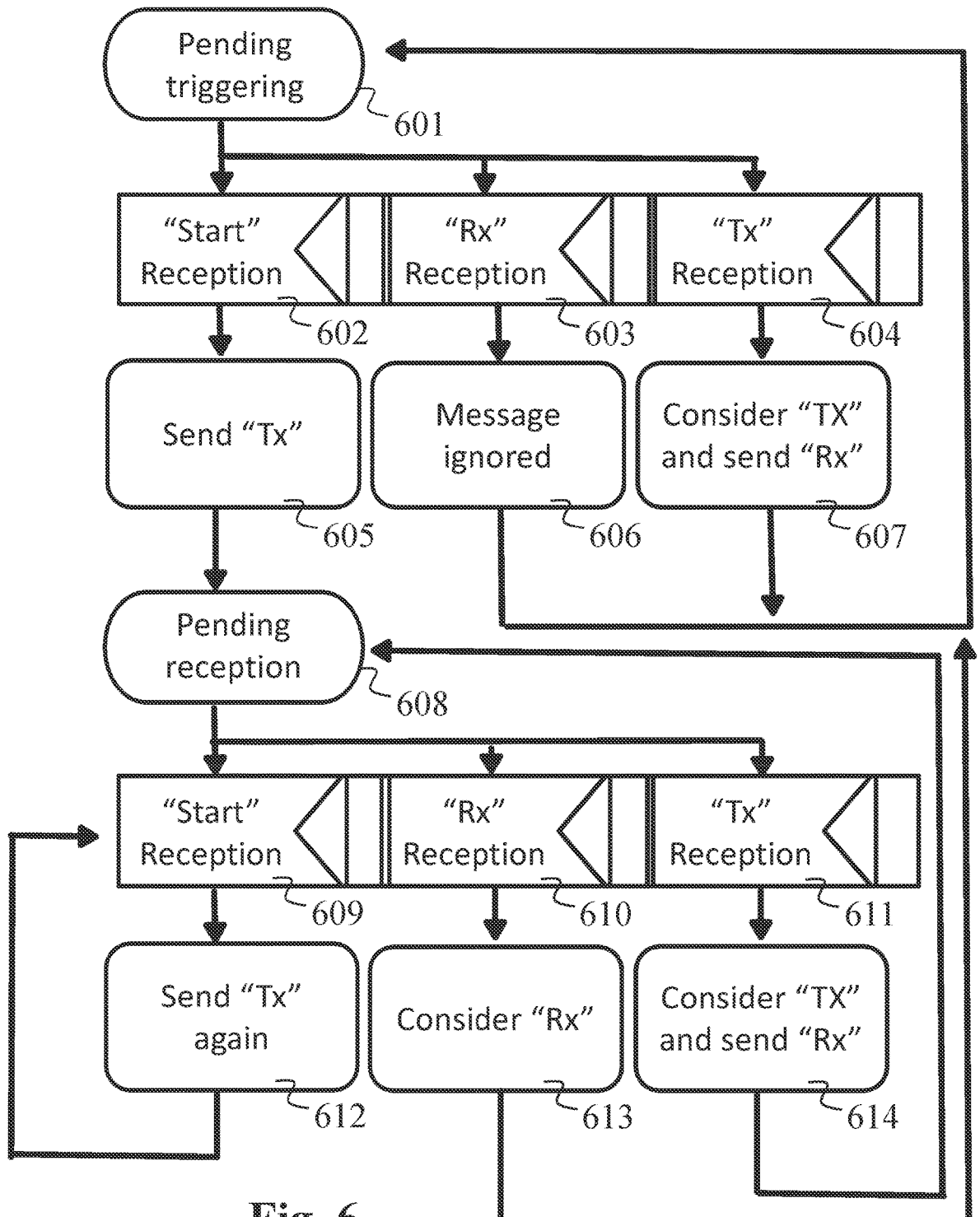
FIG. 6 schematically illustrates a state machine of an inter-probe communication protocol.

FIG. 6 schematically illustrates a state machine, or automaton, of the inter-probe communication protocol, in a particular embodiment. The inter-probe communication protocol is preferably managed by an automaton associated with each type of service (for example, each DSCP field value of the encapsulation packets) of each communication tunnel, in conjunction with the probe management module 202 that centralizes the measured data per periodic cycle of measurements.

The messages exchanged within the context of the inter-probe communication protocol contain information representing transmission (TX) or reception (RX) flow measurements via the considered communication tunnel and a message type that indicates whether the included information relates to transmission (TX) or reception (RX), which can allow the remote network probe 130 to adapt its role (upstream or downstream). The exchanged messages can include additional information, such as the type of traffic involved (for example, DSCP field value), message sequence numbers, and/or acknowledgement information. Each time a message is received by the probe management module 202, the metrics stored by the probe management module 202 are updated.

The aforementioned start-up sequence places the automaton in a "Pending triggering" state 601. Three events can cause the automaton to exit this state:

- a "Start" event 602, which notifies the automaton of a periodic cycle boundary (one cycle ends and another cycle begins). This event 602 triggers a step 605;
- an "Rx" event 603, which notifies the automaton of the reception of an RX type message. This event 603 triggers a step 606;
- a "Tx" event 604, which notifies the automaton of the reception of a TX type message. This event 604 triggers a step 607.

In step 605, the inter-probe protocol management module 203 asks the probe management module 202 to build, from the stored metrics for the considered communication tunnel and the considered type of service, a TX message, and to transmit the built TX message to the remote network probe 130. The automaton then enters a "Pending reception" state 608.

In step 606, the inter-probe protocol management module 203 detects that it has received an unexpected RX message (for example, a late RX message), and ignores it. The automaton then reverts to the "Pending triggering" state 601.

In step 607, the inter-probe protocol management module 203 detects that it has received a TX message via the probe management module 202. The inter-probe protocol management module 203 notifies the probe management module 202 of the content of the received TX message, for updating the corresponding metrics in the memory. In addition, the inter-probe protocol management module 203 asks the probe management module 202 to build, from the stored metrics for the considered communication tunnel and the considered service type, an RX message, and to transmit the built RX message to the remote network probe 130. The automaton then reverts to the "Pending triggering" state 601.

Three events can cause the automaton to exit the "Pending Reception" state 608:

a "Start" event 609, which notifies the automaton of a periodic cycle boundary (one cycle ends and another cycle begins). This event 609 triggers a step 612;

an "Rx" event 610, which notifies the automaton of the reception of an RX type message. This event 610 triggers a step 613;

a "Tx" event 611, which notifies the automaton of the reception of a TX type message. This event 604 triggers a step 614.

In step 609, the inter-probe protocol management module 203 asks the probe management module 202 to build, from the stored and updated metrics for the considered communication tunnel and the considered service type, a new TX message and to send it to the remote network probe 130. This situation occurs when the inter-probe protocol management module 203 has not received the expected RX message from the remote network probe 130 in response to the TX message transmitted when the last "Start" event was received. The automaton then reverts to the "Pending Reception" state 608.

In step 610, the inter-probe protocol management module 203 detects that it has received an RX message via the probe management module 202. The inter-probe protocol management module 203 notifies the probe management module 202 of the content of the received TX message, for updating the corresponding metrics in the memory and notifying the application module 201. The probe management module 202 or the application module 201 can thus compare the data rate measurements on either side of the considered communication tunnel for the considered type of service. The application module 201 can thus instruct the router 110, with which the considered network probe 130 is associated, to adapt the admission of services at the entrance to the communication tunnel accordingly, or to notify the orchestrator 150. The automaton then enters the "Pending triggering" state 601.

In step 611, the inter-probe protocol management module 203 detects that it has received a TX message via the probe management module 202. The inter-probe protocol management module 203 notifies the probe management module 202 of the content of the received TX message, for updating the corresponding metrics in the memory. In addition, the inter-probe protocol management module 203 asks the probe management module 202 to build, from the stored metrics for the considered communication tunnel and the considered service type, an RX message, and to transmit the built RX message to the remote network probe 130. The automaton then reverts to the "Pending reception" state 608.

The automaton described above gives the inter-probe protocol management module 203 of the upstream network probe 130 a master role for each data stream passing through the communication tunnel, i.e., the network probe 130 associated with the end-point through which the monitored data traffic enters the communication tunnel. More specifically, by using UDP packets for transmitting TX messages, the upstream network probe 130 rates the generation of the RX messages at the downstream network probe 130, thereby facilitating the management of the asynchronism between the considered network probes 130.

However, an equivalent automaton can be easily derived from the above description in order to give the downstream network probe 130 this master role, i.e., the network probe 130 associated with the end-point through which the monitored data traffic exits the communication tunnel.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method implemented by a network probe in a communication system comprising a plurality of routers, the network probe being associated with a first router of said plurality of routers and with a first end-point of the first router, the method being carried out by the network probe, called first network probe herein, and comprising the following steps:

detecting, by filtering packets coming from or going to the first router, a communication tunnel between the first end-point and a second end-point of a second router of said plurality of routers;

retrieving, from at least one filtered packet, an address of the second end-point;

deducing an address of a second network probe associated with the second end-point and the second router, by applying a bijective translation function relative to the retrieved address of the second end-point;

setting-up inter-probe communications between the first network probe and the second network probe, using the deduced address of the second network probe; and carrying out data traffic monitoring in the communication tunnel, jointly by the first network probe and the second network probe, by measuring data traffic transmitted and received at the first end-point and the second end-point, respectively.

2. The method according to claim 1, wherein the bijective translation function involves applying a predefined offset relative to the retrieved address of the second end-point.

3. The method according to claim 2, wherein the address of the second network probe is deduced from the retrieved address of the second end-point, by adding one to the retrieved address of the second end-point.

4. The method according to claim 1, wherein monitoring data traffic in the communication tunnel, jointly by the first network probe and the second network probe, is carried out per service type.

5. The method according to claim 1, wherein the filtering of packets coming from or going to the first router retrieves GRE or IPSec type data packets.

6. The method according to claim 1, wherein the first network probe receives information from the second network probe representing received data for said traffic, compares it with information representing data transmitted by the first network probe for said traffic, determines whether a difference between received and transmitted data is greater than a predefined threshold, and, if so, determines an existence of a congestion situation.

7. The method according to claim 1, wherein information representing traffic monitoring is transmitted to an orchestrator of the communication system in order to adapt admissions of services.

8. A non-transitory computer readable medium comprising:

A computer program product comprising instructions for implementing the method according to claim 1, when said instructions are read from the non-transitory computer readable medium and are executed by a processor.

9. A device configured to implement a first network probe of a communication system comprising a plurality of routers, the first network probe being associated with a first router of said plurality of routers and with a first end-point of the first router, the device comprising electronic circuitry configured to:

detect, by filtering packets coming from or going to the first router, a communication tunnel between the first end-point and a second end-point of a second router of said plurality of routers;

retrieve, from at least one filtered packet, an address of the second end-point;

deduce an address of a second network probe associated with the second end-point and the second router, by applying a bijective translation function relative to the retrieved address of the second end-point;

set-up inter-probe communications between the first network probe and the second network probe, using the deduced address of the second network probe; and carry out data traffic monitoring in the communication tunnel, jointly by the first network probe and the second network probe, by measuring data traffic transmitted and received at the first end-point and the second end-point, respectively.

10. A communication system comprising a plurality of routers and comprising at least one communication tunnel between end-points of said routers, wherein a plurality of devices according to claim 9 is configured to implement network probes, in order for said network probes to jointly monitor data traffic in the at least one communication tunnel.

* * * * *